Feb. 17, 1931.  W. C. GLOVER  1,793,080
TRAP
Filed Sept. 22, 1926
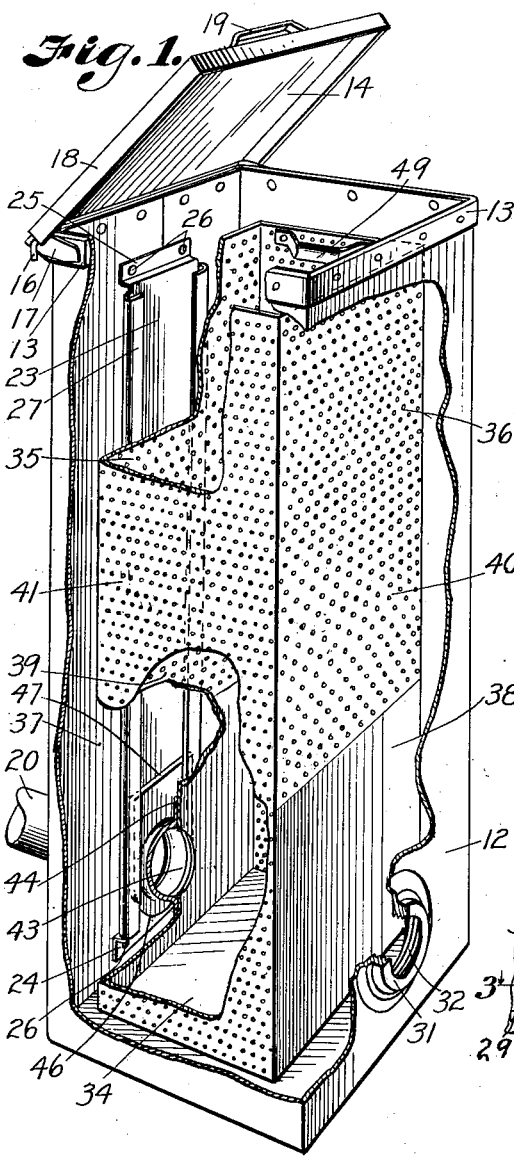
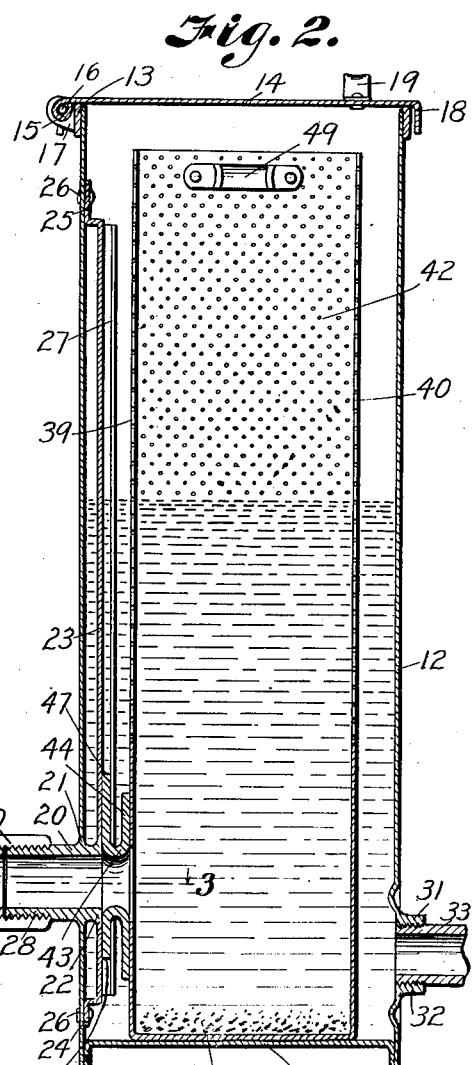
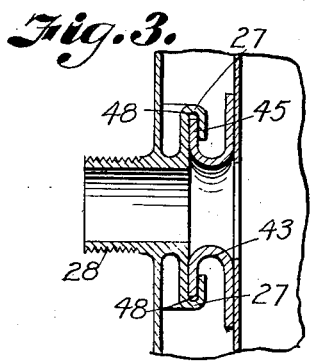
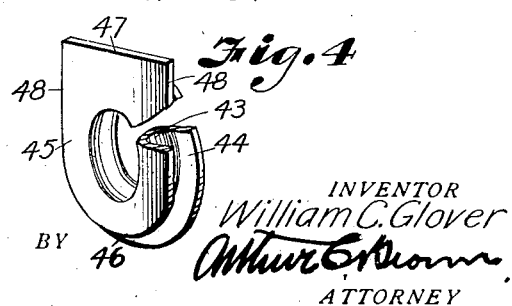
INVENTOR
William C. Glover
BY Arthur E. Brown
ATTORNEY Patented Feb. 17, 1931

1,793,080

UNITED STATES PATENT OFFICE

WILLIAM C. GLOVER, OF KANSAS CITY, MISSOURI, ASSIGNOR TO THE BUTLER MANUFACTURING COMPANY, OF KANSAS CITY, MISSOURI

TRAP

Application filed September 22, 1926. Serial No. 136,981.

My invention relates to traps and more particularly to traps for catching lint, solid particles or other foreign matter taken up by the cleaning fluid in dry cleaning systems.

It is a purpose of my invention to provide a trap for catching solid particles, such as buttons, in a dry cleaning system in which the cleaning fluid is clarified and re-used, said trap comprising a removable perforated straining member and an outer liquid-tight receptacle in which said straining member is mounted.

It is more particularly a purpose of my invention to provide means for guiding the inner perforated receptacle into proper position relative to the outer receptacle so as to align an inlet into the outer receptacle with an inlet leading into the inner receptacle, and to furthermore provide for tight engagement between the inlet members so that the solid particles that are to be caught by the straining member cannot pass between the two inlets and into the space in the trap that is intended to only contain liquid free from solid particles.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a perspective view, partly broken away, of my improved trap.

Fig. 2 is a vertical sectional view thereof.

Fig. 3 is a fragmentary sectional view taken on the line 3—3 of Fig. 2, and

Fig. 4 is a perspective view, partly broken away, of the flanged inlet member on the inner receptacle.

Referring in detail to the drawings:

My improved trap comprises an outer receptacle having a bottom 10 which may be flanged as at 11 for securement of the side walls 12 thereto. A reinforcing strip 13 may extend around the upper edge portion of the side walls 12 and a cover 14 may be mounted on the receptacle in any suitable manner, the same being shown as being hinged thereto by the hinge eyes 15 through which the hinge pin 16 extends which also extends through the ears 17 provided on the reinforcing member 13. The hinged cover member 14 is preferably provided with a downturned peripheral flange 18 and has a handle member 19 for manipulating the same. The cover member 14 is normally kept in closed position, thus forming a liquid tight receptacle which is closed at the top thereof.

One of the side walls 12 is provided with openings through which the inlet tube 20 extends, said tube being secured to the wall portion 12 so as to provide liquid tight joints in any suitable manner, as by means of welding as indicated at 21. The inlet tube 20 has a projecting end portion 22 extending inwardly from the inner face of the wall 12 and is secured to a guide member 23 in any suitable manner, as by means of welding. The guiding member 23 is provided with off-set end portions 24 and 25 by means of which the same is secured to the wall portion 12 with any suitable securing members such as the rivets 26. Said guide member 23 is provided with the longitudinally extending, hook-like flanges 27 extending along the opposite sides thereof which serve as guide members in a manner to be described below. The inlet tube 20 is further provided with a threaded outer end portion 28 by means of which the same may be secured to any suitable conduit such as the pipe 29 by any suitable coupling means such as the coupling 30. The opposite side wall 12 of the outer receptacle is provided with an outwardly flanged portion 31 which is preferably internally threaded as indicated at 32 to receive the externally threaded end portion of the pipe 33 by means of which the cleaning fluid is conducted to other parts of the apparatus. The inlet tube leads from a cleaning or washing machine and the outlet tube 33 usually leads to suitable clarifying apparatus.

Mounted within the outer receptacle described above is an inner perforated receptacle having preferably an imperforate bottom 34 and having the side walls 35 and 36 which are provided with lower imperforate portions 37 and 38 respectively and with upper perforated portions 39 and 40 respectively. The imperforate portions extend upwardly a predetermined distance above the upper edge of the inlet 20 and outlet 33 so as to prevent the flow of the cleaning fluid through the trap in a stream, acting thus as baffle members to quiet the flow of the fluid therethrough and cause the same to flow over the imperforate portions of the side walls 35 and 36 and to pass outwardly through the side walls 41 and 42 which are perforated from top to bottom thereof. The imperforate portion 37 of the wall 35 has the inlet member 43 secured thereto so as to provide a substantially liquid tight joint between the member 43 and the imperforate wall portion 37, the wall portion being provided with a suitable opening to permit the flow of liquid through the inlet 43 into the interior of the perforated member.

Preferably the inlet 43 is secured to the wall portion 37 by means of the flange portion 44 which is secured to the wall 37 by welding or in any other suitable manner. The inlet member 43 is further provided with a flange portion 45 which has a curved end portion 46 and a straight end portion 47 which is connected with a curved end portion 46 by a portion of substantially uniform width provided with the straight side edges 48. The flanged portion 45 is adapted to engage with the hook flanges 27 on the guide member 23, the curved end 46 being first inserted in the guide member as the perforated inner member of the trap is assembled with the imperforate outer member and the parts being so arranged that when the bottom 34 engages with the bottom 10 the opening in the inlet 43 will align with the opening in the inlet 20, there being, of course, an aligning opening provided in the guide member 23 where the inlet 20 passes therethrough. The flange 45 engaging with the flanges 27 furthermore will hold the flange 45 firmly in engagement with the inner end of the projecting portion 22 of the inlet tube 20 so as to prevent any of the solid particles from passing between the members 20 and 43 under which condition they would not be caught in the trap. The inner receptacle is preferably provided with suitable handles 49 to facilitate the removal thereof from the outer receptacle.

What I claim and desire to secure by Letters Patent is:

1. In a trap, an outer receptacle, having an inlet and an outlet, an inner receptacle having an inlet aligning with the first mentioned inlet, said inner receptacle having perforate walls and also having a wall provided with an imperforate portion aligning with said inlets, and positioned as a barrier intermediate the inlets and outlet, the last mentioned wall having an upper perforated portion.

2. In a trap, an outer receptacle having an inlet and an outlet, an inner receptacle having an inlet aligning with the first mentioned inlet, said inner receptacle having perforate walls, an imperforate bottom having a wall provided with an imperforate portion aligning with said outlet and having an upper perforate portion, the imperforate portion positioned intermediate the aligned inlets and outlet.

3. In a trap, a vertically disposed outer receptacle having an open upper end, a movable door closing the upper end of the receptacle, an inlet extending through one wall of said receptacle, an outlet arranged in the opposite wall of the receptacle, a vertically disposed guide arranged in one wall of the receptacle, an inner four-sided perforated receptacle bodily removable from the outer receptacle through the open end of the latter, an inlet arranged on one side wall of the inner receptacle and adapted to align with the inlet of the outer receptacle, means on the inner receptacle engaging said guide for guiding the inner receptacle into a position to align the inlets when the inner receptacle is inserted in the outer receptacle and a plate associated with the guide and functioning to close the inlet of the inner receptacle while the latter is being lifted out of the outer receptacle.

In testimony whereof I affix my signature.

WILLIAM C. GLOVER.